3,459,673
PREPARATION OF LUMINESCENT SILICA GLASS
MODIFIED WITH A RARE EARTH METAL
William V. Best, Independence, Mo., and Roland L.
Hughes, Leawood, Kans., assignors to Owens-Illinois, Inc., a corporation of Ohio
No Drawing. Continuation-in-part of application Ser. No. 412,866, Nov. 20, 1964. This application Oct. 10, 1967, Ser. No. 674,106
Int. Cl. C09k 1/04
U.S. Cl. 252—301.4      10 Claims

ABSTRACT OF THE DISCLOSURE

This invention pertains to the preparation of a luminescent silica glass modified with at least one rare earth metal component wherein a hydrolyzable silicon compound such as $SiCl_4$ is reacted in the vaporous form with a mist or fog of at least one water soluble rare earth metal salt to form silicic acid, the silicic acid then being dried and dehydrated to form silica powder. The silica powder is thereafter fused to obtain a clear transparent, luminescent glass.

Related application

This application is a continuation-in-part of copending U.S. patent application Ser. No. 412,866, filed Nov. 20, 1964, now abandoned.

The invention

This invention relates to the praparation of modified silicas including both the hydrated and dehydrated forms thereof. More particularly, this invention relates to the production of hydrated and dehydrated silica modified with a rare earth-metal component, e.g., as a simple or complex oxide thereof with silica or in any other form in which the rare-earth modifier may be associated with the silica when the method of this invention is practiced.

Still more particularly the invention is concerned with the preparation of a luminescent silica glass by a process which involves direct reaction between (1) a hydrolyzable silicon compound such as silicon tetrachloride, specifically a vaporous hydrolyzable silicon compound, and (2) an aqueous solution (or a mist or fog of an aqueous solution) containing a water-soluble salt of a rare-earth metal, so as to obtain homogeneously modified or "doped" silicic acid which is then dried and at least partially dehydrated to yield a modified or doped silica powder. Fusion of this silica powder modified with a rare earth-metal component results in a transparent, modified glass that is useful in applications where rare earth-modified silica glasses are employed.

In our copending application Ser. No. 412,614, filed Nov. 20, 1964, concurrently with the parent application hereof and assigned to the same assignee as the present invention, we have disclosed and claimed a method of preparing silica modified with a rare earth-methl component which involves introducing a mist or fog of oxygen, water and water-soluble salt of a rare-earth metal into a conical-diffusion type of flame of a particular $SiCl_4$- oxyhydrogen burner. The aforesaid mist is produced, for example, by nebulizing an aqueous solution of the aforesaid salt with an oxygen-supplying, more particularly oxygen-containing, gas such as oxygen itself and/or air.

Prior to the present invention the doping of finely divided, ultrapure silica with a rare earth-metal component was accomplished by a series of steps, one of which involved the sorption (adsorption and/or absorption) of the respective rare-earth metal ion or combination of different rare-earth metal ions onto and/or into a finely divided silica smoke in a water solution.

In accordance with this invention a hydrolyzable silicon compound, preferably silicon tetrachloride, is reacted directly with an aqueous dopant comprising a water-soluble salt of a rare-earth metal. This is advantageous over the prior-art technique in that a homogeneously doped or modified silicic acid is obtained in a single operation without the multiplicity of steps previously required, thereby lowering its cost. Furthermore, doping levels can be controlled to a level of reproducibility that is equal to, or better than, that obtained by the prior-art method. Additionally, by suitable selection of the rare-earth modifier and by partial dehydration, especially by controlled dehydration, of the doped silicic acid, one can obtain a modified silica material that is luminescent, more particularly phosphorescent and/or fluorescent.

It is a primary object of the present invention to provide a new method of forming an intimate association of silica (as such or in the form of silicic acid) and a rare earth-metal component, more particularly such a component which is derived from a water-soluble salt of a rare-earth metal.

Another object of the invention is to provide a simple and economical method of producing a modified or doped silica of the kind described in the preceding paragraph.

Other objects of the invention will be apparent to those skilled in the art from the following more detailed description of the invention and from the appended claims.

The foregoing and other objects of the invention are attained by practicing the present invention as briefly described in the first paragraph of this specification and more fully hereafter.

In accordance with this invention, a vaporous hydrolyzable silicon compound, preferably ultrapure $SiCl_4$, is brought into contact by any suitable means with an aqueous solution (as such or in the form of a fog or mist thereof) comprising a water-soluble salt of a rare-earth metal. (Such aqueous compositions are herein for brevity sometimes designated as "dopant" or as "aqueous dopant.") For example, the hydrolyzable silicon compound, e.g. $SiCl_4$ with a B.P. of about 57.6° C., may be gradually vaporized (which $SiCl_4$, for example, will do slowly at about 20°–30° C.) and the vapors conveniently contacted with a liquid mass of the aforesaid dopant. Or, the hydrolyzable compound may be caused to evolve vapor by appropriate heating to its respective boiling point, and then permitting the evolved either to contact the surface of a liquid mass of the aqueous dopant or causing it to be inroduced beneath the surface of the mass through a tube or series of tubes or inlet ports which may be connected, if desired, to a single or a plurality of headers of any desired shape, e.g., round, square, rectangular, cloverleaf, etc. In the latter case the gaseous hydrolyzable silicon compound, alone or preferably with an inert carrier gas, passes through or is distributed throughout the aqueous liquid dopant with which it reacts. By this latter technique, the aqueous liquid mass of dopant may be at a temperature ranging, for example, from about 1° C. to just below the boiling point of the liquid reaction mass, e.g., 99° C., as desired or as conditions may require. Preferably, the temperature ranges from about 1° C. to ambient temperature (e.g., 20°–30° C.).

Alternatively, the hydrolyzable vapor may be permitted to flow upwards through a column of falling aqueous dopant in the form of a falling liquid, or the dopant may be in mist or spray form admixed with a carrier gas (e.g., air, oxygen, nitrogen, argon, helium, carbon dioxide, etc.). When either of these techniques is used, the aqueous dopant may be at a temperature ranging, for instance, from about 1° C. to about 100° C.

Another embodiment of the present invention involves the direct reaction of hydrolyzable silicon compound vapor with a finely divided (nebulized) aqueous dopant. Nebulization of a liquid produres a more homogeneous droplet size than does direct atomization. Furthermore, the droplets comprising water and rare-earth salt provide a large contact area for rapid and complete reaction of silicon compound and water to produce a modified silica powder.

In this last-named embodiment of the invention the nebulized or finely divided droplets of dopant entrained in a carrier gas (numerous examples of which have been given hereinbefore) are directed into a horizontal zone. The droplets of dopant preferably are at ambient temperature (20°–30° C.). Concurrently with the introduction of the nebulized dopant there is passed into the reaction zone through a separate conduit or conduits (preferably at least two conduits) either vaporous hydrolyzable silicon compound alone or admixed with a carrier gas, e.g., air and/or oxygen and/or any other carrier gas of which examples previously have been given. The hydrolyzable vapor and the droplets of aqueous dopant react at their interfaces; and, also, to some extent in the vapor phase.

The aforesaid reaction zone is so heated as to provide a temperature gradient over the length of the zone. This gradient varies from about 30° C. at the inlet end to about 900° C. at the outlet end of the zone. The reaction by-products, such as HCl when SiCl₄ is used, and excess water vapors are vented from the reaction zone through an outlet port located at the top of a collection system that is attached, preferably detachably attached, to the end of the reaction zone. The product, viz, silica powder modified with a rare earth-metal component, e.g., a rare earth-substance comprising an oxide thereof, is withdrawn from the collection system and from the forward portion of the side wall of the reaction zone at the end of a run or series of runs.

The collection system may comprise, for example, a fused silica bottle having a tubular side arm that has been sweated upon, taped to or otherwise connected with the end of the reaction zone; and which is additionally provided with a top opening for the venting of gases and a bottom opening for the withdrawal of product. The collection system may include a plurality of fused silica bottles connected to each other and provided with means to heat them above 150° C. and to withdraw by-product gas(es) such as HCl and excess water vapor from at least the last in the series of such bottles.

The amount of rare-earth salt which is dissolved in water, and the resulting solution then brought into reactive relationship with the vaporous hydrolyzable silicon compound, is a function of the selected salt, its solubility in water, the amount desired to be brought into intimate relationship or association with the modified silica product, the operating conditions of the silica producing process, the chosen conditions of operating the nebulizer (if a nebulizer is used), and other influencing factors. The amount of salt of rare-earth metal in the aqueous solution comprising the dopant ranges, for example, from about 0.1 g./liter up to a saturated solution at 50° C.; but ordinarily the salt is used in an amount corresponding from about 0.1 g./liter to about 100 g./liter. Obviously, no more rare-earth salt should be employed than is necessary to produce the desired degree of modification of the silica product with the rare earth-metal component.

Any water-soluble, rare-earth salt may be employed, but in a preferred embodiment hereof, it is contemplated using the nitrates of chlorides. Illustrative examples of salts of the rare-earth metals that may be used are the following water-soluble salts of:

Lathanum:
   Acetate
   Bromate
   Bromide
   Chloride
   Molybdate
   Nitrate
   Sulfate
Cerium:
   Acetate (ous)
   Bromate (ous)
   Carbonate (ous)
   Chloride (ous)
   Nitrate (ous)
   Selenate (ous)
   Sulfate (ous)
Praseodymium:
   Acetate
   Bromate
   Chloride
   Selenate
   Sulfate
Neodymium:
   Acetate
   Bromate
   Bromide
   Chloride
   Nitrate
   Sulfate
Samarium:
   Acetate
   Bromate
   Chloride
   Sulfate
Europium:
   Sulfate
   Chloride
   Nitrate
Gadolinium:
   Acetate
   Bromide
   Chloride
   Nitrate
   Selenate
   Sulfate
Terbium:
   Chloride
   Nitrate
   Sulfate
Dysprosium:
   Acetate
   Bromate
   Chloride
   Chromate
   Nitrate
   Selenate
   Sulfate
Erbium:
   Chloride
   Nitrate
   Sulfate
Thulium:
   Chloride
Ytterbium:
   Acetate
   Chloride
   Sulfate
Lutetium:
   Sulfate Water-soluble salts of yttrium, e.g., yttrium chloride, nitrate or sulfate, also may be used. Although yttrium is not classified among the rare-earth elements in Mendeleev's Table of the Periodic Arrangement of the Elements, if functions in the same way as do those rare-earth metals listed in said table (water-soluble salts of which have been given above by way of example). Hence, those skilled in the art presently consider yttrium among the rare-earth elements, and this is the classification given it in this specification.

The amount of water in which the water-soluble rare-earth salt is dissolved is at least, and preferably is in excess of, the stoichiometrical amount required for complete hydrolysis of the hydrolyzable siilcon compound, e.g. in the case of SiCl₄, sufficient water to hydrolyze the tetrachloride to meta-silicic acid $(H_2SiO_3)_x$. The maximum amount of water used as a solvent for the rare-earth salt is determined primarily by economic considerations, since it must subsequently be removed in order to obtain the modified silica. Other influencing factors are, for example, the particular water-soluble rare earth-metal salt that is chosen and its solubility in water, the quantity of rare earth-metal component desired in the modified silica end-product, the chosen method of bringing the silicon compound and aqueous dopant into reactive relationship, and similar factors. Ordinarily the water is present in the aqueous dopant in a molar amount corresponding to at least 4 moles, and preferably from 5 or 6 to about 200 or more moles, of water per mole of silicon compound reactant.

Typical hydrolyzable silicon compounds contemplated herein include both inorganic and organic compounds including the silicon hydrides or silanes such as $SiH_4$ (monosilane),
$Si_2H_6$ (disilane),
$Si_3H_8$ (trisilane),
$Si_4H_{10}$ (tetrasilane),
$Si_5H_{12}$ (pentasilane),
$Si_6H_{14}$ (hexasilane),
$Si_7H_{16}$,
$Si_8H_{18}$,
$Si_9H_{20}$,
$Si_{10}H_{22}$;

alkylsilane such as $CH_3SiH_3$ (monomethylsilane),
$(CH_3)_2SiH_2$ (dimethylsilane),
$(CH_3)_3SiH$ (trimethylsilane),
$C_2H_5SiH_3$ (monoethylsilane),
$(C_2H_5)_2SiH_2$ (diethylsilane),
$(C_2H_5)_3SiH$ (triethylsilane),
$(CH_3)_4Si$ (silicon tetramethyl),
$(C_2H_5)_4Si$ (silicon tetraethyl),
$C_3H_7SiH_3$,
$(C_3H_7)_2SiH_2$,
$(C_3H_7)_3SiH$,
$(C_3H_7)_4Si$ (silicon tetrapropyl),
$C_4H_9SiH_3$,
$(C_4H_9)_2SiH_2$,
$(C_4H_9)_3SiH$,
$(C_4H_9)_4Si$ (silicon tetrabutyl),
$C_5H_{11}SiH_3$,
$(C_5H_{11})_2SiH_2$,
$(C_5H_{11})_3SiH$,
$(C_5H_{11})_4Si$ (silicon tetraisoamyl),
$C_6H_{13}SiH_3$,
$(C_6H_{13})_2SiH_2$,
$(C_6H_{13})_3SiH$,
$(C_6H_{13})_4Si$,
$C_7H_{15}SiH_3$,
$(C_7H_{15})_2SiH_2$,
$(C_7H_{15})_3SiH$,
$(C_7H_{15})_4Si$,
$(C_6H_5)_4Si$ (silicon tetraphenyl),
$(C_7H_7)_4Si$ (silicon tetra-m-tolyl or tetra-p-tolyl),
$(C_6H_5)_4Si$ (silicon tetrabenzyl),
$(C_{12}H_9)_4Si$ (silicon tetraxenyl),
$(CH_3)_3C_6H_5Si$ (trimethylphenylsilane),
$(CH_3)_2C_6H_5)_2Si$ (dimethyldiphenylsilane),
$CH_3(C_6H_5)_3Si$ (methyltriphenylsilane),
$(C_2H_5)_3C_6H_5Si$ (triethyphenylsilane),
$(C_2H_5)_2(C_6H_5)_2Si$ (diethyldiphenylsilane),
$C_2H_5(C_6H_5)_3Si$ (ethyltriphenylsilane),
$(CH_3)(C_2H_5)(n-C_3H_7)(C_6H_5)Si$ (methylethylpropylphenylsilane),
$C_2H_5)(n-C_3H_7)(i-C_4H_9)(CH_2C_6H_5)Si$ (ethyl-n-propyl-i-butylbenzylsilane),
$(C_6H_5)_3SiH$ (triphenylsilane),
$(C_6H_5CH_2)_3SiH$ (tribenzylsilane);

the organosilicon halide particularly the alkylhalosilanes such as $CH_2SiH_2Cl$,
$CH_3SiHCl_2$,
$CH_3SiCl_3$,
$CH_2ClSiH_3$,
$CHCl_2SiH_3$,
$CCl_3SiH_3$
$CHCl_2SiH_2Cl$,
$CH_2ClSiHCl_2$,
$CH_2ClSiH_2Cl$,
$C_2H_5SiH_2Cl$,
$C_2H_5SiHCl_2$,
$C_2H_5SiCl_3$,
$C_2H_7SiH_2Cl$,
$C_3H_7SiHCl_2$,
$C_3H_7SiCl_3$;

the silicon halides such as the $SiCl_4$,
$SiI_4$,
$SiH_3Cl$ (monochlorosilane),
$SiH_2Cl_2$ (dichlorosilane),
$SiHCl_3$ (trichlorosilane),
$SiH_3Br$ (monobromosilane),
$SiH_2Br_2$ (dibromosilane),
$SiHBr_3$ (tribromosilane),
$SiH_3I$ (monoiodosilane),
$SiH_2I_2$ (diiodosilane),
$SiHI_3$ (triiodosilane),
$SiCl_2$ (silicon dichloride),
$SiBr_2$ (silicon dibromide),
$SiI_2$ (silicon iododichloride),
$Si_2Cl_6$ (silicon trichloride),
$Si_2BR_6$ (silicon tribromide),
$Si_2I_6$ (silicon triiodide),
$SiICl_3$ (silicon iodotrichloride),
$SiI_2Cl_2$ (silicon iododichloride),
$SiBrCl_3$ (silicon bromotrichloride),
$SiBr_2Cl_2$ (silicon bromodichloride),

| | | |
|---|---|---|
| $Si_3Cl_8$, | $Si_3Br_6I_2$, | $Si_5Cl_{11}Br$, |
| $Si_3Br_8$, | $Si_3Br_5I_3$, | $Si_5Cl_{10}Br_2$, |
| $Si_3I_8$, | $Si_3Br_4I_4$, | $Si_5Cl_9Br_3$, |
| $Si_4Cl_{10}$, | $Si_3Br_3I_5$, | $Si_5Cl_8Br_4$, |
| $Si_4Br_{10}$, | $Si_3Br_2I_6$, | $Si_5Cl_7Br_5$, |
| $Si_4I_{10}$, | $Si_3BrI_7$, | $Si_5Cl_6Br_6$, |
| $Si_5Cl_{12}$, | $Si_4Cl_9I$, | $Si_5Cl_5Br_7$, |
| $Si_5Br_{12}$, | $Si_4Cl_8I_2$, | $Si_5Cl_4Br_8$, |
| $Si_5I_{12}$, | $Si_4Cl_7I_3$, | $Si_5Cl_3Br_9$, |
| $Si_6Cl_{14}$, | $Si_4Cl_6I_4$, | $Si_5Cl_2Br_{10}$, |
| $Si_6Br_{14}$, | $Si_4Cl_5I_5$, | $Si_5ClBr_{11}$, |
| $Si_6I_{14}$, | $Si_4Cl_4I_6$, | $Si_5Cl_{11}I$, |
| $SiIBr_3$, | $Si_4Cl_3I_7$, | $Si_5Cl_{10}I_2$, |
| $SiI_2Br_2$, | $Si_4Cl_2I_8$, | $Si_5Cl_9I_3$, |
| $SiClBr_3$, | $Si_4ClI_9$, | $Si_5Cl_8I_4$, |
| $SiBrI_3$, | $Si_4Cl_9Br$, | $Si_5Cl_7I_5$, |
| $SiClI_3$, | $Si_4Cl_8Br_2$, | $Si_5Cl_6I_6$, |
| $Si_3Cl_7I$, | $Si_4Cl_7Br_3$, | $Si_5Cl_5I_7$, |
| $Si_3Cl_6I_2$, | $Si_4Cl_6Br_4$, | $Si_5Cl_4I_8$, |
| $Si_3Cl_5I_3$, | $Si_4Cl_5Br_5$, | $Si_5Cl_3I_9$, |
| $Si_3Cl_4I_4$, | $Si_4Cl_4Br_6$, | $Si_5Cl_2I_{10}$, |
| $Si_3Cl_3I_5$, | $Si_4Cl_3Br_7$, | $Si_5ClI_{11}$, |
| $Si_3Cl_2I_6$, | $Si_4Cl_2Br_8$, | $Si_5Br_{11}I$, |
| $SiClI_7$, | $Si_4ClBr_9$, | $Si_5Br_{10}I_2$, |
| $Si_3Cl_7Br$, | $Si_4Br_9I$, | $Si_5Br_9I_3$, |
| $Si_3Cl_6Br_2$, | $Si_4Br_8I_2$, | $Si_5Br_8I_4$, |
| $Si_3Cl_5Br_3$, | $Si_4Br_7I_3$, | $Si_5Br_7I_5$, |
| $SiBrI_3$, | $Si_4Br_6I_4$, | $Si_5Br_6I_6$, |
| $Si_3Cl_4I_4$, | $Si_4Br_5I_5$, | $Si_5Br_5I_7$, |
| $Si_3Cl_5I_3$, | $Si_4Br_4I_6$, | $Si_5Br_4I_8$, |
| $Si_3Cl_6I_2$, | $Si_4Br_3I_7$, | $Si_5Br_3I_9$, |
| $SiClI_7$, | $Si_4Br_2I_8$, | $Si_5Br_2I_{10}$, |
| $Si_3Br_7I$, | $Si_4BrI_9$, | $Si_5BrI_{11}$; | the alkylalkoxysilanes or alkylsilicic esters (ethers) such as $(CH_3)_3SiOH$ (trimethylsilanol),
$(C_2H_5)SiOH$ (triethylsilanol),
$(n-C_3H_7)_3SiOH$ (tripropylsilanol),
$(i-C_5H_{11})_3SiOH$ (tri-i-amylsilanol),
$(C_6H_5)_3SiOH$ (triphenylsilanol),
$(p-C_7H_7)_3SiOH$ (tri-p-tolylsilanol),
$(C_6H_5CH_2)_3SiOH$ (tribenzylsilanol), (CH$_3$)(C$_2$H$_5$)(C$_6$H$_6$)SiOH (methylethylphenylsilanol),
(C$_2$H$_5$)$_2$(C$_6$H$_5$)SiOH (diethylphenylsilanol),
(C$_2$H$_5$)(n-C$_3$H$_7$)(C$_6$H$_5$)SiOH (ethylpropylphenyl silanol),
CH$_3$(C$_6$H$_5$CH$_2$)$_2$SiOH (methyldibenzylsilanol),
C$_2$H$_5$(C$_6$H$_5$CH$_2$)$_2$SiOH (ethyldibenzylsilanol),
(C$_2$H$_5$)$_2$(C$_6$H$_5$CH$_2$)SiOH (diethylbenzylsilanol),
(C$_2$H$_5$)(n-C$_3$H$_7$)(C$_6$H$_5$CH$_2$)SiOH (ethylpropylbenzylsilanol),
(C$_2$H$_5$)(i-C$_4$H$_9$)(C$_6$H$_5$CH$_2$)SiOH (ethyl-i-butylbenzylsilanol),
(C$_6$H$_5$)$_2$Si(OH)$_2$ (diphenylsilanediol),
(C$_6$H$_5$CH$_2$)$_2$Si(OH)$_2$ (dibenzylsilanediol),
C$_2$H$_5$(C$_6$H$_5$)Si(OH)$_2$ (ethylphenylsilanediol),
C$_2$H$_5$(C$_6$H$_5$CH$_2$)Si(OH)$_2$ (ethylbenzylsilanediol),
(CH$_3$)$_3$SiOCH$_3$ (trimethylmethoxysilane),
(CH$_3$)$_3$SiOC$_2$H$_5$ (trimethylethoxysilane),
(CH$_3$)$_3$SiOC$_4$H$_9$ (trimethylbutoxysilane),
(CH$_3$)$_2$Si(OC$_2$H$_5$)$_2$ (dimethyldiethoxysilane),
(CH$_3$)$_2$Si(OC$_4$H$_9$)$_2$ (dimethyldibutoxysilane),
(C$_2$H$_5$)$_2$Si(OC$_2$H$_5$)$_2$ (diethyldiethoxysilane),
diphenylethynyldiethoxysilane,
CH$_3$Si(OC$_2$H$_5$)$_3$ (methyltriethoxysilane),
CH$_3$Si(OC$_4$H$_9$)$_3$ (methyltributoxysilane),
C$_2$H$_5$Si(OCH$_3$)$_3$ (ethyltrimethoxysilane),
C$_2$H$_5$Si(OC$_2$H$_5$)$_3$ (ethyltriethoxysilane),
i-C$_3$H$_7$Si(OC$_2$H$_5$)$_3$ (isopropyltriethoxysilane),
i-C$_4$H$_9$Si(OC$_2$H$_5$)$_3$ (isobutyltriethoxysilane),
i-C$_7$H$_{11}$Si(OC$_2$H$_5$)$_3$ (isoamyltriethoxysilane),
C$_6$H$_{13}$Si(OC$_2$H$_5$)$_3$ (hexyltriethoxysilane),
C$_3$H$_5$Si(OC$_2$H$_5$)$_3$ (allyltriethoxysilane),
C$_6$H$_5$Si(OC$_2$H$_5$)$_3$ (phenyltriethoxysilane),
C$_6$H$_5$Si(OC$_6$H$_5$)$_3$ (phenyltriphenoxysilane),
C$_6$H$_5$CH$_2$Si(OC$_2$H$_5$)$_3$ (benzyltriethoxysilane),
trimethylbutoxysilane,
Si(OC$_2$H$_5$)$_4$ (ethyl silicate),
HSi(OC$_2$H$_5$)$_3$,
H$_2$Si(OC$_2$H$_5$)$_2$,
H$_3$Si(OC$_2$H$_5$),
Si(OCH$_3$)$_4$ (methyl silicate),
HSi(OCH$_3$)$_3$,
H$_2$Si(OCH$_3$)$_2$,
H$_3$Si(OCH$_3$),
Si(OC$_3$H$_7$)$_4$,
HSi(OC$_3$H$_7$)$_3$,
H$_2$Si(OC$_3$H$_7$)$_2$,
H$_3$Si(OC$_3$H$_7$),
Si(OC$_4$H$_9$)$_4$,
HSi(OC$_4$H$_9$)$_3$,
H$_2$Si(OC$_4$H$_9$)$_2$,
H$_3$Si(OC$_4$H$_9$)$_2$,
H$_3$Si(OC$_4$H$_9$),
Si(OC$_6$H$_{13}$)$_4$,
HSi(OC$_6$H$_{13}$)$_3$,
H$_2$Si(OC$_6$H$_{13}$)$_2$,
H$_3$Si(OC$_6$H$_{13}$),
(SiH$_3$)$_2$O (disiloxane),
(SiCl$_3$)$_2$O (hexachlorodisiloxane),
(SiBr$_3$)$_2$O (hexabromodisiloxane),
Si(OC$_6$H$_5$)$_4$ (phenyl silicate),
Si(OC$_5$H$_{11}$)$_4$ (amyl silicate),
Si(OC$_7$H$_7$)$_4$ (benzyl silicate),
(CH$_3$O)$_6$Si$_2$O (hexamethoxydisiloxane),
(C$_2$H$_5$O)$_6$Si$_2$O (hexaethoxydisiloxane).

Other hydrolyzable silicon compounds include

SiHBr$_3$ (silico bromoform),
SiHCl$_3$ (silico chloroform),
SiHI$_3$ (silico iodoform),
Si$_2$O$_2$(OH)$_2$ (silico oxalic acid),
SiB$_3$ (silicon triboride),
SiB$_6$ (silicon hexaboride),
Si$_2$Br$_6$ (silicon tribromide),
(C$_2$H$_5$)$_2$(C$_6$H$_5$)$_2$Si (diethyldiphenylsilane),
C$_2$H$_5$(C$_6$H$_6$)$_3$Si (ethyltriphenylsilane),
(CH$_3$)(C$_2$H$_5$)(n-C$_3$H$_7$)(C$_6$H$_5$)Si (methylethylpropylphenylsilane),
(C$_2$H$_5$)(n-C$_3$H$_7$)(i-C$_4$H$_9$)(CH$_2$C$_6$H$_5$)Si (ethyl-n-propyl-i-butylbenzylsilane),
(CH$_3$)$_3$SiCl (trimethylchlorosilane),
(CH$_3$)$_3$SiBr (trimethylbromosilane),
(C$_2$H$_5$)$_3$SiCl (triethylchlorosilane),
(C$_2$H$_5$)$_3$SiBr (triethylbromosilane),
(n-C$_3$H$_7$)$_3$SiBr (tripropylbromosilane),
(i-C$_4$H$_9$)$_3$SiBr (triisobutylbromosilane),
(i-C$_5$H$_{11}$)$_3$SiBr (triisoamylbromosilane),
(C$_6$H$_5$)$_3$SiCl (triphenylchlorosilane),
(C$_6$H$_5$)$_3$SiBr (triphenylbromosilane),
(p-C$_7$H$_7$)$_3$SiCl (tri-p-tolylchlorosilane),
(C$_6$H$_5$CH$_2$)$_3$SiCl (tribenzylchlorosilane),
(CH$_2$CHCH$_2$)(CH$_3$)$_2$SiCl (allyldimethylchlorosilane),
C$_2$H$_5$(C$_6$H$_5$)$_2$SiCl (ethyldiphenylchlorosilane),
(C$_6$H$_5$)(C$_2$H$_5$)(n-C$_3$H$_7$)SiCl (phenylethylpropylchlorosilane),
(C$_6$H$_5$CH$_2$)(C$_2$H$_5$)(n-C$_3$H$_7$)SiCl (benzylethylpropylchlorosilane),
(C$_6$H$_5$CH$_2$)(C$_2$H$_5$)(i-C$_4$H$_9$)SiCl (benzylethyl-i-butylchlorosilane),
(CH$_3$)$_2$SiBr$_2$ (dimethyldibromosilane),
(CH$_3$)$_2$SiCl$_2$ (dimethyldichlorosilane),
(C$_2$H$_5$)$_2$SiCl$_2$ (diethyldichlorosilane),
divinyldichlorosilane,
(n-C$_3$H$_7$)$_2$SiCl$_2$ (dipropyldichlorosilane),
allyldichlorosilane,
diallyldichlorosilane,
(C$_6$H$_5$)$_2$SiCl$_2$ (diphenyldichlorosilane),
(p-BrC$_6$H$_4$)$_2$SiCl$_2$ (di-p-bromophenyldichlorosilane),
(C$_6$H$_5$)$_2$SiBr$_2$ (diphenyldibromosilane),
(p-C$_7$H$_7$)$_2$SiCl$_2$ (di-p-tolyldichlorosilane),
(C$_6$H$_5$CH$_2$)SiCl$_2$ (dibenzyldichlorosilane),
vinylmethyldichlorosilane,
allylmethyldichlorosilane,
C$_2$H$_5$(n-C$_3$H$_7$)SiCl$_2$ (ethylpropyldichlorosilane),
C$_2$H$_5$(i-C$_4$H$_9$)SiCl$_2$ (ethylisobutyldichlorosilane),
C$_2$H$_5$(C$_6$H$_5$CH$_2$)SiCl$_2$ (ethylphenyldichlorosilane),
C$_2$H$_5$(C$_6$H$_5$CH$_2$)SiCl$_2$ (ethylbenzyldichlorosilane),
C$_6$H$_5$(C$_6$H$_5$CH$_2$)SiCl$_2$ (phenylbenzyldichlorosilane),
C$_6$H$_5$(p-BrC$_6$H$_4$)SiCl$_2$( phenyl-p-bromophenyldichlorosilane),
CH$_3$SiCl$_3$ (methyltrichlorosilane),
C$_2$H$_5$SiCl$_3$ (ethyltrichlorosilane),
vinyltrichlorosilane,
n-C$_3$H$_7$SiCl$_3$ (propyltrichlorosilane),
allylmethyldichlorosilane,
n-C$_4$H$_9$SiCl$_3$ (butyltrichlorosilane),
i-C$_4$H$_9$SiCl$_3$ (isobutyltrichlorosilane),
i-C$_5$H$_{11}$SiCl$_3$ (isoamyltrichlorosilane),
C$_6$H$_5$SiCl$_3$ (phenyltrichlorosilane),
C$_6$H$_{11}$SiCl$_3$ (cyclohexyltrichlorosilane),
p-C$_7$H$_7$SiCl$_3$ (p-tolytrichlorosilane),
C$_6$H$_5$CH$_2$SiCl$_3$ (benzyltrichlorosilane),
a-C$_{10}$H$_7$SiCl$_3$ (a-naphthyltrichlorosilane),
CH$_3$SiBr$_3$ (methyltribromosilane),
(CH$_3$)$_3$SiOH,
(CH$_3$)$_6$Si$_2$ (hexamethyldisilane),
(C$_2$H$_5$)$_6$Si$_2$ (hexaethyldisilane),
(C$_3$H$_7$)$_6$Si$_2$ (hexa-n-propyldisilane),
(C$_2$H$_5$)$_2$(C$_3$H$_7$)$_2$(C$_6$H$_5$)Si$_2$ diethyldipropyldiphenyldisilane),
(C$_2$H$_5$)$_2$(C$_3$H$_7$)$_2$(C$_7$H$_7$)$_2$Si$_2$ diethyldipropyldibenzyldisilane),
(C$_6$H$_5$)$_6$Si$_2$ (hexaphenyldisilane),
(C$_7$H$_7$)$_6$Si$_2$ (hexa-p-tolyldisilane or hexabenzyldisilane),
octaphenyltetrasilane,
cyclooctaphenyltetrasilane,
octa-p-tolyltetrasilane,
cycloocta-p-tolyltetrasilane,
(C$_3$H$_7$)$_6$Si$_2$O (hexapropyldisiloxane),
(C$_2$H$_5$)$_6$Si$_2$O (hexaethyldisiloxane), $(CH_3)_6Si_2NH$ (hexamethyldisilazine),
$(CH_3)_6Si_2O$ (hexamethyldisiloxane),
$(C_7H_7)_8Si_4O$,
$(C_6H_5)_8Si_4O_2$ (cyclooctaphenyltetrasilane oxide or dioxide),
$(C_6H_5O)_2(C_6H_5)_6Si_4$,
$(C_5H_{11})_6Si_2O$ (hexaisoamyldisiloxane),
$(C_6H_5)_6Si_2O$ (hexaphenyldisiloxane),
$(C_7H_7)_6Si_2O$ (hexa-p-tolyldisiloxane),
$(CH_3)_2(C_6H_5)_4Si_2O$ (dimethyltetraphenyldisiloxane),
$(C_2H_5)_2(C_6H_5)_1Si_2O$ (diethyltetraphenyldisiloxane),
$(C_2H_5)_2(n-C_3H_7)_2Si_2O$ (diethyldipropyldibenzyldisiloxane),
$(CH_5)_2(i-C_4H_9)_2(C_7H_7)_2Si_2O$ (diethyldibutyldibenzyldisiloxane),
$(C_6H_5)_4Si_2O(OH)_2$ (tetraphenyldisiloxane-1,3-diol),
$(C_6H_5)_6Si_3O_2(OH)_2$ (hexaphenyltrisiloxane-1,5-diol),
$(C_2H_5)_2(C_6H_5)_2Si_2O(OH)_2$ (diethyldiphenyldisiloxane-1,3-diol),
$(C_7H_7)_4Si_2O(OH)_2$ (tetrabenzyldisiloxane-1,3-diol),
$(C_7H_7)_4Si_3O_2(OH)_2$ (hexabenzyltrisiloxane-1,5-diol),
$(Me_2SiO)_3$ (hexamethylcyclotrisiloxane),
$(Et_2SiO)_3$ (hexaethylcyclotrisiloxane),
$(C_6H_5)_6Si_3O_3$ (hexaphenylcyclotrisiloxane),
$(C_6H_5)_8Si_4O_4$ (octaphenylcyclotetrasiloxane),
$(C_7H_7)_6Si_3O_3$ (hexabenzylcyclotrisiloxane),
$(EtBzSiO)_3$ (triethyltribenzylcyclotrisiloxane).

In addition, applicants incorporate herein by reference all hydrolyzable compounds listed on pages 166 to 195 of "Silicones and Other Organic Silicon Compounds," by Howard W. Post, Reinhold Publishing Corporation, New York, N.Y. (1949), and on pages 316 to 710 of "Handbook of Organometallic Compounds," by Herbert C. Kaufman, D. Van Nostrand Co., Inc., Princeton, N.J. (1961).

In a preferred embodiment hereof, it is contemplated using $SiCl_4$. The reaction of $SiCl_4$ and a dopant comprising a water solution of a water-soluble salt of a rare-earth metal yields silicic acid (hydrated silica) and hydrochloric acid when the reaction temperature is below 100° C. and the amount of water employed is in excess of the reaction stoichiometry. The silicic acid (incipient silica gel) polymerizes over a varying time period that is determined by such influencing factors as pH, temperature, etc. The silicic acid and silica gel sorbs and exchanges rare-earth cations with the surrounding water to produce a homogeneous, doped silica gel. HCl gas, a reaction by-product when $SiCl_4$ and like hydrolyzable silicon halide compounds are used, dissolves in the excess water to form hydrochloric acid.

Any suitable method may be used for removing the excess hydrogen halide, specifically HCl, and water. For example, these ingredients can be removed by passing the rare earth-doped silicic acid through a zone heated from about 100° C. to about 900° C. While suspended in a carrier gas, e.g., air and/or oxygen, nitrogen, helium, argon, carbon dioxide, etc. Or, the doped silicic acid can be collected as a gel for removal of excess water and by-product HCl by a series of heat-treatments. For instance, if there is a large excess of water, the HCl gas can be expelled from the doped water solution-silica gel (polymeric silicic acid) admixture by gently heating the same at about 100° C. until all the HCl and most of the water have been driven off. The doped silica gel is then fired at a suitable temperature, more particularly at from about 220° C. to about 900° C. to yield a doped silica powder. Depending upon the water-soluble salt of the particular rare-earth metal employed, this silica powder may be both fluorescent and phosphorescent during and after irradiation with a 2537 A. ultraviolet source. For example, such a result is obtained when the rare-earth salt is terbium nitrate. In the latter case, quite surprisingly and unobviously, subsequent fusion of the terbium-modified silica powder results in a fused silica which is fluorescent but not phosphorescent under 2537 A. irradiation.

In order that those skilled in the art may better understand how the present invention can be carried into effect, the following examples are given by way of illustration and not by way of limitation. All parts and percentages are by weight unless otherwise stated.

Example 1

Terbium nitrate 0.0185 g. (gram); 99.9+ purity is dissolved in 75 ml. (milliliter) distilled water, and the resulting solution is added to a 1000 ml. high-purity silica beaker. Twenty-six (26) g. of ultrapure silicon tetrachloride is added to a 50 ml. high-purity silica beaker, which is then placed inside the 1000 ml. beaker so that it rests at the center of the bottom of the larger beaker. The latter is enveloped by a polyethylene bag, which subsequently is sealed, thereby closing the system from the outer air. The resulting assembly is at ambient temperature.

The silicon tetrachloride distills slowly into the aqueous solution of terbium nitrate. The reaction is complete in six hours, yielding a very clear, rigid, doped gel. This gel is then removed from the larger beaker, 20 ml. of distilled water added thereto, and the admixture transferred to a high-purity silica dish wherein it is slowly evaporated to dryness over an electric mantle at a temperature of about 100° C.

The dried, doped, hydrated silica is then fired at red heat for 15 minutes, yielding 5 g. of doped silica powder. This doped silica is both fluorescent and phosphorescent during and after irradiation with a 2537 A. ultraviolet source.

Fusion of the doped silica powder with an oxyhydrogen torch of flame yields a clear, transparent glass which is fluorescent but not phosphorescent under 2537 A. irradiation.

From the foregoing it will be apparent to those skilled in the art that the silicas modified with one or more rare earth-metal components resulting from the method of this invention are useful in making luminescent (e.g., ultraviolet - fluorescent, phosphorescent, cathodoluminescent, etc.) glasses, or as components thereof, e.g., in making a coating on glasses or other substrates); as neutron absorbers; and for other purposes.

Example 2

Same as in Example 1 with the exception that 0.0155 g. of terbium chloride $TbCl_3 \cdot 6H_2O$, is used instead of 0.0185 g. of terbium nitrate, $Tb(NO_3)_3 \cdot 6H_2O$. Similar results are obtained.

Example 3

Doped silicic acids are produced as described in Examples 1 and 2 using equivalent molar amounts of the following water-soluble salts of rare-earth metals instead of the terbium nitrate of Example 1 or the terbium chloride of Example 2.

Cerium bromate(ous)
Cerium nitrate (ous)
Dysprosium acetate
Dysprosium nitrate
Europium chloride
Europium nitrate
Lanthanum chloride
Lanthanum bromide
Neodymium chloride
Neodymium nitrate
Praseodymium acetate
Praseodymium chloride
Samarium nitrate
Ytterbium sulfate
Yttrium chloride The resulting doped silicic acid gels are useful for subsequent polymerization, dehydration and fusion into clear, transparent silica glasses having a rigidly determined doping level. The glasses may be used in applications such as mentioned under Example 1 and for other purposes.

Instead of using a single water-soluble salt of a rare-earth metal as employed in this example, one may use a mixture of such salts, e.g., two or more salts such as given above and wherein the cations are the same and the anions are different, or two or more such salts wherein the cations are different and the anions are the same or different.

Example 4

This example illustrates the preparation of a rare earth-doped silica by the embodiment of the invention wherein nebulized droplets of dopant entrained in a carrier gas (numerous examples of which have been given hereinbefore) are reacted with $SiCl_4$ vapor.

The apparatus employed includes a nebulizer of the kind described in our aforementioned copending application Ser. No. 412,614, filed Nov. 20, 1964.

The apparatus used in substantially the same as that described hereinbefore with reference to that embodiment of the present invention which involves the reaction of $SiCl_4$ vapor with a dopant in the form of an aqueous composition comprising a water-soluble salt of a rare-earth metal; and, more particularly, in the form of a mist or fog of finely divided, e.g., nebulized, droplets of water containing the aforesaid water-soluble salt, said droplets being entrained in a carrier gas such, for instance, as oxygen and/or air.

The reaction tube, formed of fused silica, is 30 cm. long and 26 mm. I.D. The tube is wrapped with an electrical resistance wire over its entire length. This wire is so wound as to provide a temperature gradient ranging between about 40° C. at its rear end and about 900° C. at its forward end. The rear end is closed with a Teflon stopper which is sealed with a Teflon tape having a silicone adhesive on one side. The stopper is provided with the following openings: a central opening, 14 mm. in diameter, and a plurality of openings, specifically two openings, each 6 mm. in diameter, on each side of the larger opening for the introduction of $SiCl_4$ vapor admixed with a carrier gas, examples of which have been given hereinbefore. Through the larger opening is passed a tightly fitting, fused silica tubing or reactant-feed conduit which extends about 5 mm. within the reaction tube. This conduit is for the passage of a nebulized dopant solution. Through the plurality of openings, specifically two openings, on each side of the 14 mm. opening are passed tightly fitting, fused silica reactant-feed tubes or inlet ports for the introduction of $SiCl_4$ vapor and/or $SiCl_4$ vapor mixed with a carrier gas, e.g., an oxygen-containing gas such as air and/or oxygen. The latter tubes extend into the reaction zone a lesser distance than does the reactant tube or inlet port carrying the $SiCl_4$-containing vaporous reactant. More particularly, the latter tubes extend about 3–4 mm. within the reaction zone. The exit ends of each of the $SiCl_4$ conduits are 2 mm. I.D. so that the $SiCl_4$ feed will be sprayed a short distance downstream before coming in contact with the aqueous dopant feed.

Detachably attached to the exit end of the reaction tube or zone is a fused silica bottle having a side are connected to the reaction tube and a Teflon-stoppered bottom opening. It also has an opening in its top, about 26 mm. I.D., for removal of by-product gases including HCl and, also, water. The freshly formed, doped silica powder is deposited in and collected from this bottle, which is maintained above 150° C. by means of a heat gun. All joints are suitably sealed, e.g., with Teflon tape having a silicone adhesive on one side.

In operation, twenty-five hundredths (0.25) mole of $SiCl_4$ vapor mixed with 2 moles of $O_2$ is introduced continuously into the above-described reactor through the $SiCl_4$-reactant feed tubes. (The reactor is at a temperature of about 40° C. at its inlet end and about 750° C. at its outlet end.) Simultaneously and during the same time period (90 minutes) there is also continuously passed into the reaction zone 0.09 g. of terbium nitrate, $Tb(NO_3)_3$, dissolved in 18 g. of doubly deionized water in the form of a nebulized mist or fog which is produced by means of the aforementioned nebulizer with the aid of about 15 moles of carrier gas, specifically air. This mist is passed into the reactor through the aforementioned 14 mm. central feed conduit.

The resulting rare earth-modified silica powder is obtained in a good yield in the fused silica collection bottle and on the walls of the high-temperature portion of the reaction tube.

Instead of using terbium nitrate as the water-soluble salt of a rare-earth metal as described in the foregoing example, similar results are obtained by using other rare-earth salts, e.g., terbium chloride, europium chloride, europium nitrate, neodymium nitrate, or any other water-soluble salt of a rare-earth metal, numerous examples of which have been given hereinbefore.

Although this invention has been described and illustrated in the foregoing examples with reference to $SiCl_4$, it will be obvious to those skilled in the art that other hydrolyzable silicon compounds can be used.

Thus, as will be apparent to those skilled in the art, modifications of the present invention can be made or followed in the light of the foregoing disclosure without departing from the spirit and scope of the disclosure as recited in the hereinafter claims.

We claim:
1. A process for preparing a solid, homogeneously, doped, luminescent silica glass which comprises
   reacting at least one vaporous, hydrolyzable silicon compound with a mist of an aqueous solution of a water soluble salt of a rare earth metal to form silicic acid, the amount of water in the aqueous solution being at least equivalent to the stoichiometric amount required for complete hydrolysis of the silicon compound,
   drying and dehydrating the silicic acid to obtain a finely-divided, doped, substantially pure silica powder,
   and then fusing the doped silica powder to obtain a clear transparent, luminescent glass.
2. The process as in claim 1 wherein the water-soluble salt of a rare-earth metal is a water-soluble nitrate of said metal.
3. The process as in claim 1 wherein the water-soluble salt of a rare-earth metal is a water-soluble chloride of said metal.
4. The process as in claim 1 wherein the water-soluble salt of a rare-earth metal is a water-soluble salt of terbium.
5. The process as in claim 1 wherein the water-soluble salt of a rare-earth metal is a water-soluble salt of europium.
6. A process for preparing a solid, homogeneously, doped, luminescent silica glass which comprises
   reacting vaporous, ultrapure $SiCl_4$ with a mist of an aqueous solution of a water soluble salt of a rare earth metal to form silicic acid, the amount of water in the aqueous solution being at least equivalent to the stoichiometric amount required for complete hydrolysis of the $SiCl_4$,
   drying and dehydrating the silicic acid to obtain a finely-divided, doped, substantially pure silica powder,
   and then fusing the doped silica powder to obtain a clear transparent, luminescent glass.
7. The process as in claim 6 wherein the water-soluble salt of a rare-earth metal is a water-soluble nitrate of said metal.
8. The process as in claim 6 wherein the water-soluble salt of a rare-earth metal is a water-soluble chloride of said metal.

9. The process as in claim 6 wherein the water-soluble salt of a rare-earth metal is a water-soluble salt of terbium.

10. The process as in claim 6 wherein the water-soluble salt of a rare-earth metal is a water-soluble salt of europium.

References Cited

UNITED STATES PATENTS 2,252,500 8/1941 Fonda.
2,886,414 5/1959 Secord.
2,990,249 6/1961 Wagner.
3,297,414 1/1967 Mazdiyasni et al.

TOBIAS E. LEVOW, Primary Examiner
ROBERT D. EDMONDS, Assistant Examiner

U.S. Cl. X.R.

106—52